United States Patent
Wilson et al.

(10) Patent No.: US 8,908,854 B2
(45) Date of Patent: Dec. 9, 2014

(54) COMMUNICATIONS MODULE

(75) Inventors: Simon Wilson, Newbury (GB); Ellyse Brause, San Jose, CA (US); Helen Blackburn, London (GB); Manrique Brenes, Corona del Mar, CA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 13/345,866

(22) Filed: Jan. 9, 2012

(65) Prior Publication Data
US 2013/0176378 A1 Jul. 11, 2013

(51) Int. Cl.
*H04M 3/00* (2006.01)
(52) U.S. Cl.
USPC .................................................. 379/265.01
(58) Field of Classification Search
CPC . H04M 7/006; H04M 3/5183; H04M 7/0057; H04M 7/0009; H04M 15/8055; H04M 2215/745; H04M 2215/7464; H04M 2203/2011; H04M 7/123; H04L 12/66; H04L 12/2834; H04N 2201/0039; H04W 4/20; H04W 88/02
See application file for complete search history.

(56) References Cited

U.S. PATENT DOCUMENTS

| | | | | |
|---|---|---|---|---|
| 6,529,500 | B1* | 3/2003 | Pandharipande | 370/352 |
| 7,542,554 | B2* | 6/2009 | Binder | 379/90.01 |
| 7,680,255 | B2* | 3/2010 | Binder | 379/93.07 |
| 2004/0218583 | A1* | 11/2004 | Adan et al. | 370/352 |
| 2005/0271051 | A1* | 12/2005 | Holloway et al. | 370/389 |
| 2006/0245417 | A1* | 11/2006 | Conner et al. | 370/352 |
| 2007/0047489 | A1* | 3/2007 | Bachl et al. | 370/331 |
| 2007/0049307 | A1* | 3/2007 | Mueckenheim et al. | 455/509 |
| 2007/0104224 | A1* | 5/2007 | Conner et al. | 370/474 |
| 2007/0183401 | A1* | 8/2007 | Bennett | 370/352 |
| 2007/0183407 | A1* | 8/2007 | Bennett et al. | 370/352 |
| 2007/0189327 | A1* | 8/2007 | Konda | 370/466 |
| 2008/0008164 | A1 | 1/2008 | Wacker | |
| 2008/0240403 | A1* | 10/2008 | Tiso et al. | 379/265.01 |
| 2008/0260135 | A1* | 10/2008 | Siegrist | 379/210.01 |
| 2008/0276183 | A1* | 11/2008 | Siegrist et al. | 715/748 |
| 2009/0181657 | A1* | 7/2009 | Ramanathan et al. | 455/415 |
| 2010/0002687 | A1* | 1/2010 | Rosenberg et al. | 370/352 |
| 2010/0316214 | A1* | 12/2010 | Hung et al. | 379/412 |
| 2011/0013544 | A1* | 1/2011 | Smith et al. | 370/286 |
| 2011/0058661 | A1* | 3/2011 | Wang et al. | 379/201.02 |

FOREIGN PATENT DOCUMENTS

EP 2362626 8/2011

OTHER PUBLICATIONS

"International Search Report and Written Opinion", Application No. PCT/US2013/020707, (Apr. 12, 2013), 10 pages.

* cited by examiner

*Primary Examiner* — Mohammad Islam
(74) *Attorney, Agent, or Firm* — Sonia Cooper; Jim Ross; Micky Minhas

(57) ABSTRACT

A communications module comprising a network interface for connecting to a packet data network, a memory storing communication client code, a connection interface that is arranged to connect to a consumer device to establish a set of connections between the communications module and the consumer device, wherein the connection interface comprises at least one connection for exchanging analogue call signals with the consumer device; and at least one data connector; and processing means configured to convert analogue call signals received from the consumer device into packet data and supply the packet data to the network interface, the processing means further configured to execute the communication client code stored in the memory and send user interface data for display at the consumer device via the data connector.

24 Claims, 7 Drawing Sheets

COMMUNICATIONS MODULE

BACKGROUND OF THE INVENTION

Reference is first made to FIG. 1 which illustrates a known communication system 100 in which a user 102 of a household 101 operates a wireless handset 105. The wireless handset is in communication with a base station (BS) 103. The wireless base station is connected to a public switched telephone network (PSTN) 106 via a telephone socket 107. This conventional set-up allows user 102 to place a voice call over the PSTN to a telephone 109 associated with a further user 112.

Packet-based communication systems allow the user of a device to communicate across a computer network such as the Internet. These systems are beneficial to the user as they are often of significantly lower cost than fixed line or mobile networks. This may particularly be the case for long-distance communication. These systems utilise voice over internet protocol ("VoIP") over an existing network (e.g. the Internet) to provide these services, although alternative protocols can also be used Reference is now made to FIG. 2 which illustrates a communication system 200 comprising a wireless handset 105 in communication with a BS 103, which is able to make VoIP calls across the Internet 108 and can also make conventional telephone calls directly across the PSTN.

The BS 103 is connected to the PSTN 106 via telephone socket 107 to enable conventional telephone calls to be made and received. This enables user 102 to place a voice call over the PSTN via the telephone socket 107 to a telephone 109 associated with a further user 112.

The BS 103 is also connected to a modem 108, which allows the BS 103 to send and receive data from a packet based network such as the Internet 108 via telephone socket 107.

A common broadband connection method is ADSL (Asymmetric digital subscriber line) technology which provides data transmission over conventional telephone lines. When using ADSL, in order to use the data and voice services simultaneously, it is necessary to use a digital subscriber line (DSL) filter (not shown in FIG. 2). This filter is plugged into the telephone socket 107 and divides the single line into two discrete channels to avoid interference between the two services. Enough bandwidth is retained for voice telephony and the majority is used for high speed data. It will be appreciated by persons skilled in the art that other broadband connection methods may be used to connect the BS 103 to the Internet 108, for example cable, satellite, 4G, and optical fibre.

The BS 103 executes dedicated embedded client software to provide the VoIP connections as well as other functions such as registration and authentication. Therefore, by running embedded client software 110a on the BS 103, VoIP calls can be made to other devices connected to the Internet 108 executing the same client software. Thus, user 102 is able to place a VoIP call over the Internet 108 to a mobile device 111 (associated with user 122) executing client software 110b. The mobile device 111 having access to the Internet 108 via a wireless access point 114. The user 102 is also able to place a VoIP call over the Internet 108 to a computer 113 (associated with user 132) executing client software 110c that is connected to the Internet 108. It will be appreciated that client software 110a,110b,110c is provided by the same client software provider.

Base stations running embedded client software are generally more expensive than standard cordless telephones. Currently, to use a less expensive standard cordless telephone in conjunction with known client software or VoIP systems it is necessary to use a separate analogue telephone adaptor (ATA) plugged into both the telephone line and to the cordless base station.

Reference is now made to FIG. 3 which illustrates a known communication system 300 comprising an ATA 115 that is used to connect the base station BS 103 (in communication with the wireless handset 105) to a digital telephone system such as the Internet.

By running client software 110a on the ATA 115, the ATA 115 is able to provide packet based call functionality. That is, user 102 is able to place packet based calls to devices 111,113 over the Internet 108. User 102 is also able to place a call to telephone 109 connected to the PSTN network 106 by routing the call via one or more gateways 116 where they are converted into a form suitable for transmission across the PSTN 106. A user 102 can only send commands to the ATA 115 using predefined calling rules.

Furthermore it will be appreciated that the process of installing the ATA is not a simple one. That is, starting from the conventional set-up shown in FIG. 1 a user must disconnect the BS from the telephone socket 107, connect the ATA 115 to the phone socket 107, connect a power cable into the ATA 115, and connect the ATA 115 to the BS 103. Thus, making the necessary connections between the respective devices, may pose difficulties for some users.

SUMMARY OF THE INVENTION

In one aspect the invention provides a communications module comprising: a network interface for connecting to a packet data network; memory storing communication client code; a connection interface arranged to connect to a consumer device to establish a set of connections between the communications module and the consumer device, the connection interface comprising at least one connection for exchanging analogue call signals with the consumer device; and at least one data connector; and processing means configured to convert analogue call signals received from the consumer device into packet data and supply said packet data to the network interface, the processing means further configured to execute the communication client code stored in the memory and send user interface data for display at the consumer device via the data connector.

Preferably, the connection interface further comprises a power connector for establishing a power connection with the consumer device, whereby power supplied to the consumer device is supplied to the communications module.

Preferably, the user interface data is generated by processing means according to a proprietary protocol or an open standard protocol.

Preferably, the processing means is further configured to receive user data from the consumer device via the data connector and to generate said user interface data responsive to receiving said user data.

Preferably, wherein the processing means is further configured to convert packet data received over the packet data network at the network interface into analogue call data and supply said analogue call data to the connection means.

Preferably, the data connector is a serial or parallel connector.

In one embodiment of the invention, the network interface is a radio frequency transceiver. In another embodiment of the invention, the network interface is an Ethernet cable port.

In one embodiment of the invention, the communications module comprises a circuit switched network interface for connecting to a circuit switched network.

Preferably, the communication client code is configured to access a communication system and establish a packet data call.

Preferably, the communication client code is configured to obtain an authorisation certificate for exchanging in call establishment.

Another aspect provides a consumer device comprising: a call interface for receiving analogue call signals and processing means for supplying the analogue call signals to a connection interface; the connection interface arranged to connect to a communications module to establish a set of data connections between said connection interface and the communications module, the connection interface comprising at least one connector for exchanging analogue call signals with the communications module; and at least one data connector, wherein the consumer device is configured to receive user interface data for display at the consumer device via the data connector.

Preferably, the connection interface further comprises a power connector for establishing a power connection with the communications module, whereby power supplied to the consumer device is supplied to the communications module.

Preferably, the consumer device is configured to receive power from a power source.

Preferably, the user interface data is received via the data connector according to a proprietary protocol or an open standard protocol.

Preferably, the data connector is a serial or a parallel connector.

In one embodiment of the invention the consumer device is a telephone base station connected to a handset. In this embodiment the user interface data may be transmitted from the base station to the handset via the call interface and displayed on a display of the handset.

The telephone base station may be connected to the handset by a wired connection. Alternatively, the call interface is a radio frequency transceiver coupled to radio frequency module to enable the telephone base station to transmit the user interface data wirelessly to the handset. The radio frequency transceiver may transmit the user interface data wirelessly to the handset according to a proprietary protocol or an open standard protocol. The open standard protocol implemented may be CAT-iq.

Preferably, the telephone base station comprises an interface to a circuit switched network.

In another embodiment of the invention the consumer device is a television and the user interface data is displayed on a screen of the television.

In yet another embodiment of the invention the consumer device is one of a video disc player arranged to connect to a television, a set top box arranged to connect to a television, a personal video recorder arranged to connect to a television and a games console arranged to connect to a television, wherein the user interface data is displayed on the television.

In embodiments of the invention, user 102 is able to have access to services provided by the client software, for example the user 102 is able to see a contact list associated with the client software on the wireless handset.

BRIEF DESCRIPTION OF THE DRAWINGS

For a better understanding of the present invention and to show how the same may be put into effect, reference will now be made, by way of example, to the following drawings in which.

DETAILED DESCRIPTION

Embodiments of the invention discussed in the following provide an analogue telephone adapter (ATA) as a base station plugin module to enhance the functionality of cordless telephones.

The concept is to integrate the ATA into a module that can be plugged in as a single connection into the base station, and only requires the Ethernet cable (and/or possibly wireless) to be connected.

No rewiring of the telephone connections are required as these would be taken care of by the plugging in of the module. Only a single connection to the network (Ethernet) or possibly no connections (wireless) are required to add VoIP and UI functionality to a cordless base station. No separate power supply is required.

Additional communication of data between the ATA and the base station is possible using a data connector as a link to provide for additional UI features on the handset(s) such as setup information, directory transfer, contacts lists etc.

The cordless basestation is designed such that it is possible to plug in the separately available 'ata module' that is running a communication client that will give the cordless 'phones the ability to use a communication client with a user interface on each handset.

Figure 4A:
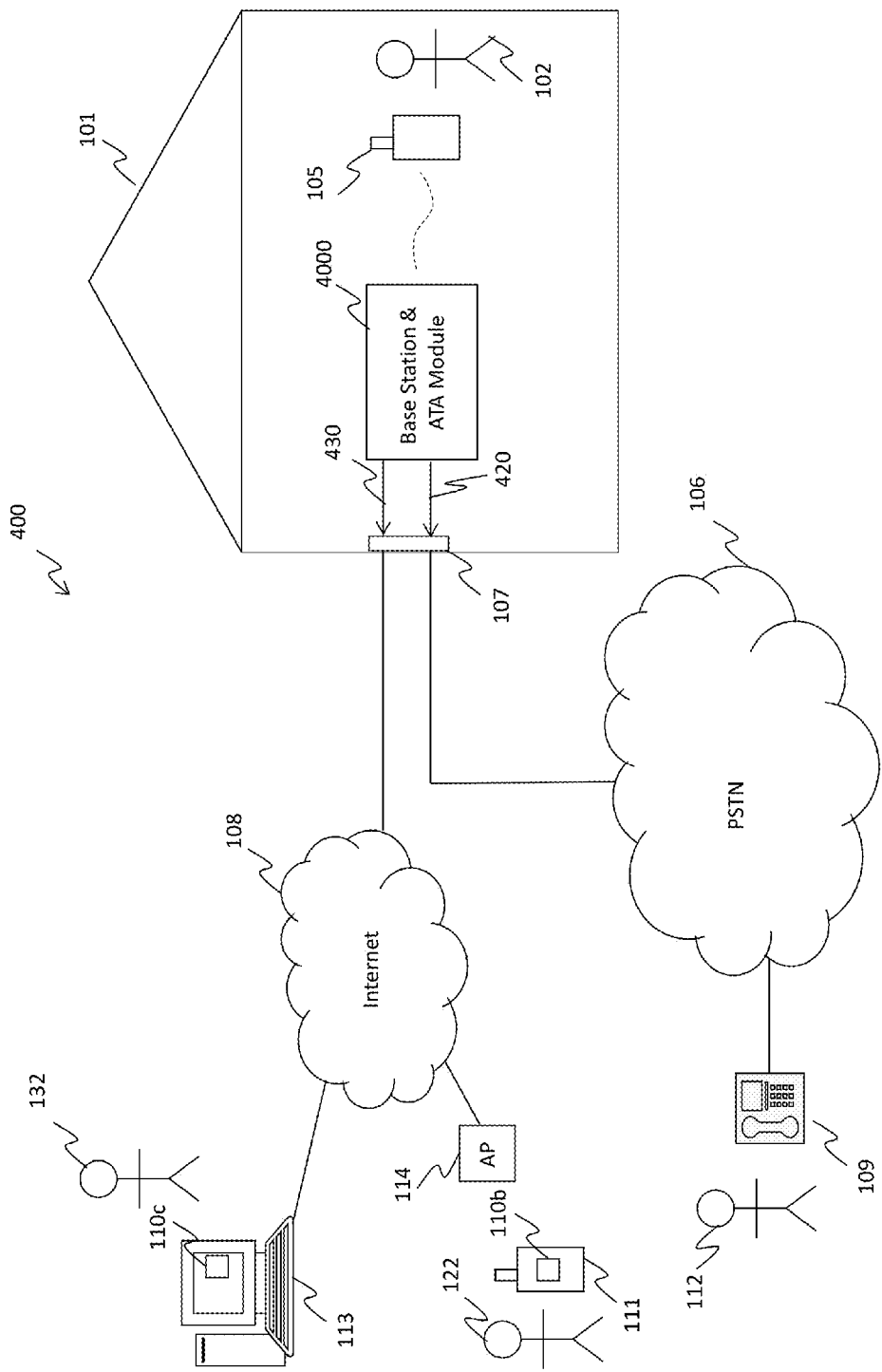
FIG. 4a shows a communication system according to one embodiment of the invention.

FIG. 4a illustrates a communication system 400 according to one embodiment of the invention in which a user 102 is able to use a Base Station & ATA Module configuration 4000 to place calls over both the PSTN 106 and a packet-based network such as the Internet 108.

Figure 4B:
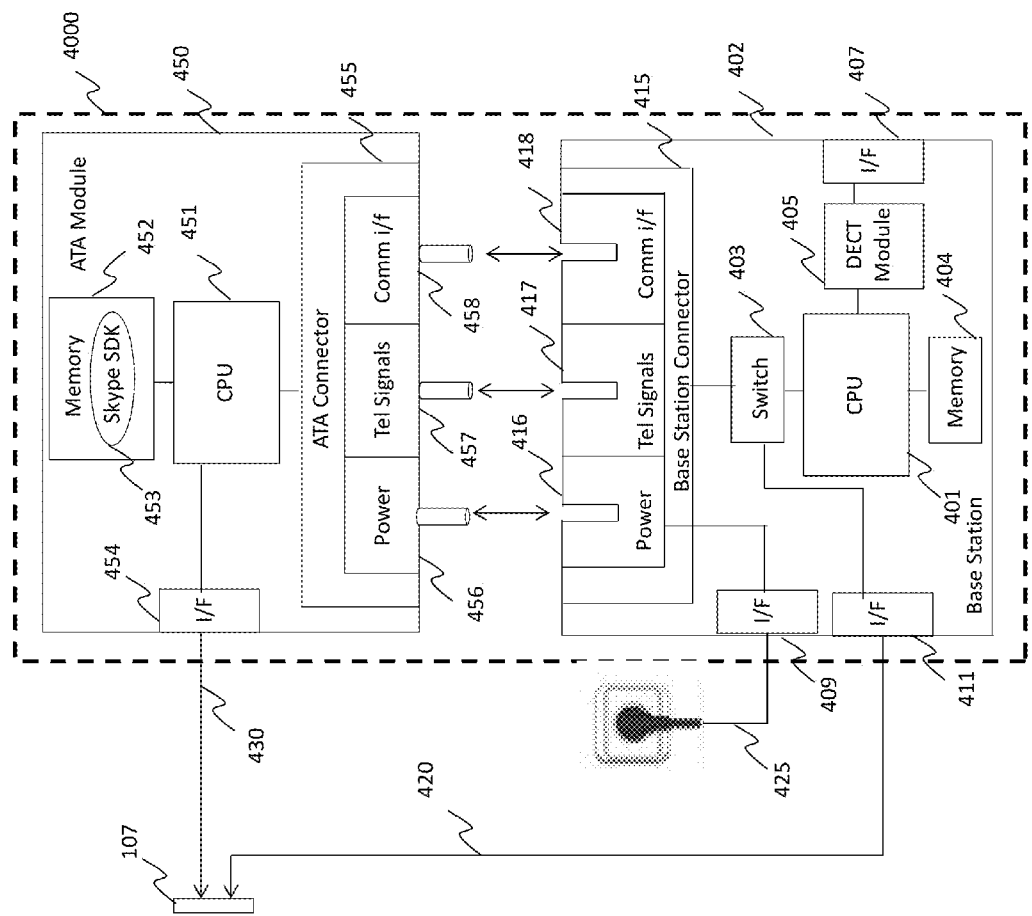
FIG. 4b shows a base station and an analogue telephone adapter module according to one embodiment of the invention.

The Base Station & ATA Module configuration 4000 is illustrated in more detail in FIG. 4b. As shown in FIG. 4b the Base Station & ATA Module configuration 4000 comprises a base station (BS) 402 and an analogue telephone adapter module 450.

Reference will first be made to the BS 402. The BS 402 is configured to connect to handset 105 using an interface 407. The BS 402 and handset 105 may be configured as a "corded" phone such that a wired connection connects the handset 105 and the BS 402. Alternatively the BS 402 and handset 105 may be configured as a "cordless" or "wireless" phone (as shown in FIG. 4a) such that the handset 105 connects to the BS 402 using a short range wireless communication protocol. In a preferred embodiment, the wireless handset 105 connects to the BS 402 using the digital European cordless telecommunications ("DECT") standard. In alternative embodiments, the wireless handset 105 connects to the BS 402 using a different cordless telephone standard such as personal handyphone system ("PHS"), or using an alternative wireless standard such as Bluetooth, IEEE 802.11 ("WiFi"), ultra-wideband ("UWB") or any other suitable wireless communications protocol.

The BS 402 comprises a central processing unit ("CPU") 401, which controls the operation of the BS 402. Coupled to the CPU is memory 404. Memory 404 may comprise a non-volatile memory such as an electronic erasable and programmable memory (EEPROM, or "flash" memory).

When the handset 105 is a wireless handset, a radio frequency ("RF") module is connected to the CPU 401, which implements the particular radio communication standard used between the handset 105 and the BS 402, such as a DECT module 405. The RF signals are transmitted and received via interface 407. It will be appreciated that when the handset 105 connects to the BS 402 via a wired connection, the module 405 is not required.

The BS 402 is configured to connect to an external power source using a power cable 425 via a power interface 409. A PSTN interface 411 is connected to the CPU 401 for connecting the BS 402 to the PSTN 106.

In one embodiment of the invention a switching module 403 is connected to, and operates under the control of, the CPU 401. In this embodiment the switching module 403 may be a hardware component integrated into the BS 402, for example a relay or analogue switches. In operation, the switching module 403 is configured to send analogue call signals to either the PSTN interface 411 or to a base station interface 415 under the control of the CPU 401.

The base station interface 415 comprises a power connector 416, a telephone signal connector 417 and a data connector 418. As shown in FIG. 4b, the power connector 416 is connected to the power interface 409. Whilst the connectors 416, 417 and 418 are shown in FIG. 4 as "female" connectors, it will be appreciated by persons skilled in the art that "male" connectors may be used. That is, base station interface 415 is configured to "mate" with a correspondingly shaped interface.

In another embodiment of the invention the switching module is omitted and a replaceable connector (not shown in FIG. 4) is able to be plugged into the base station interface 415 of the BS 402. When the replaceable connector is plugged into the base station interface 415, the replaceable connector bridges the connection between the CPU 401 and the PSTN interface 411. This allows analogue call signals to be sent from the CPU 401 to the PSTN interface 411.

In operation when the BS 402 is acting as a stand-alone device, the BS 402 is configured to receive analogue call signals at the interface 407 from handset 105 to call a PSTN number directly using the PSTN 106 i.e. device 109. The CPU 401 then receives the analogue call signals from the interface 407. When a switching module 403 is used, the CPU 401 determines that no connection has been made to the base station interface 415, and the CPU 401 controls the switching module 403 to supply the analogue call signals to the PSTN interface 411. Alternatively, when the BS 402 is acting as a stand-alone device and a replaceable connector referred to above is used, the replaceable connector may be plugged into the base station interface 415, and the CPU 401 supplies the analogue call signals to the base station interface 415. In this case, the replaceable connector bridges the connection between the CPU 401 and the PSTN interface 411 to supply the analogue call signals to the PSTN interface 411

The analogue call signals are then able to be sent from the PSTN interface 411 across a telephone cable 420 to the telephone socket 107 which enables the analogue call signals to be transmitted across the PSTN 106 in a conventional manner.

When a user wishes to place a call via a packet based network such as the Internet 108, the user is able to plug-in a separate ATA module 450.

The ATA module 450 comprises an ATA interface 455 that comprises a power connector 456, a telephone signal connector 457 and a data connector 458. Whilst the connections 456, 457 and 458 are shown in FIG. 4b as "male" connectors, it will be appreciated by persons skilled in the art that "female" connectors may be used. Regardless of the type of connectors used, the ATA interface 455 is shaped to correspond with the base station interface 415 such that the ATA module 450 may be plugged into the BS 402. The connectors mate to provide a secure physical and electrical connection.

The ATA module 450 does not comprise its own power source nor does it comprise a connection that is used to connect directly to an external power source. Instead, power is delivered to the ATA module 450 using dedicated connectors of the ATA interface 455 and the base station interface 415. As described hereinabove, the base station interface 415 comprises a power connector 416 that is connected to the power interface 409 that is configured to receive power from an external power source using a power cable 425. When the ATA module 450 is plugged into the BS 402 the power connector 416 makes an electrical contact with power connector 456 such that power can be delivered from the BS 402 to the ATA module 450.

Figure 1:
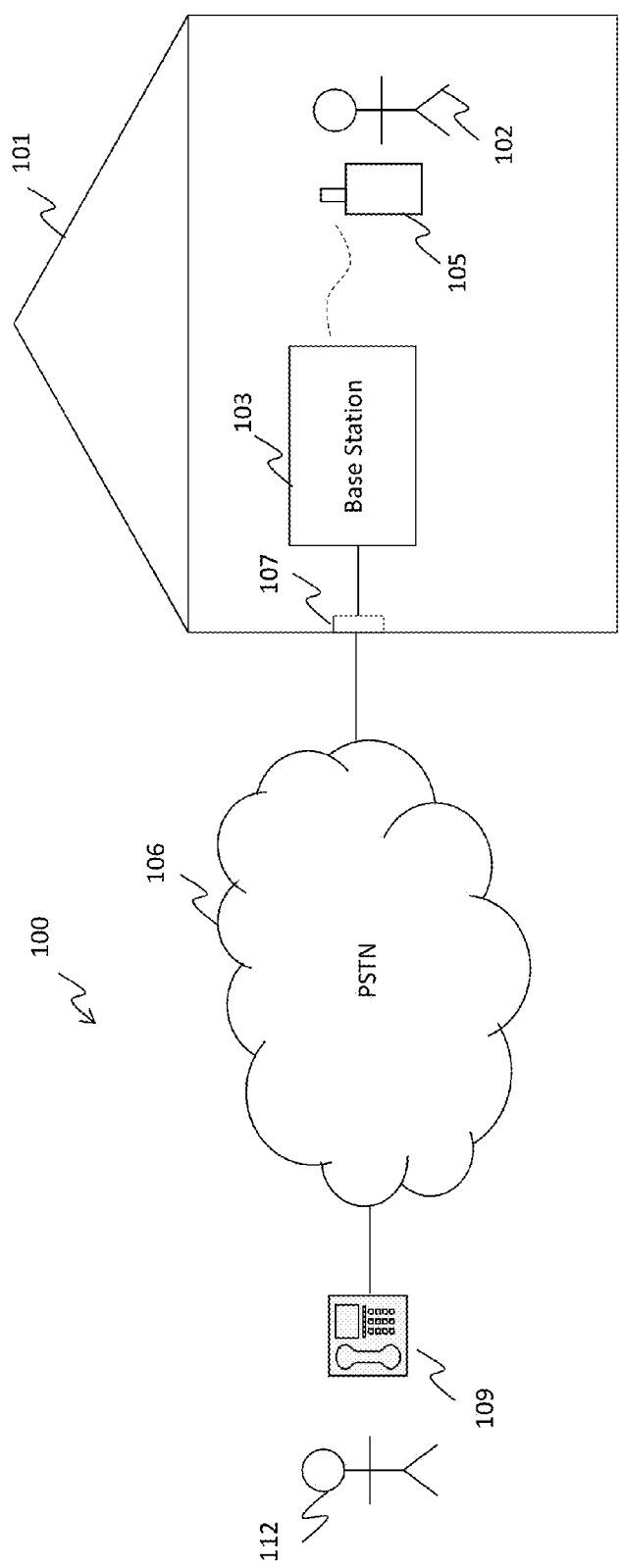
FIG. 1 shows a communication system comprising a base station configured to place a call over a PSTN network.
Figure 2:
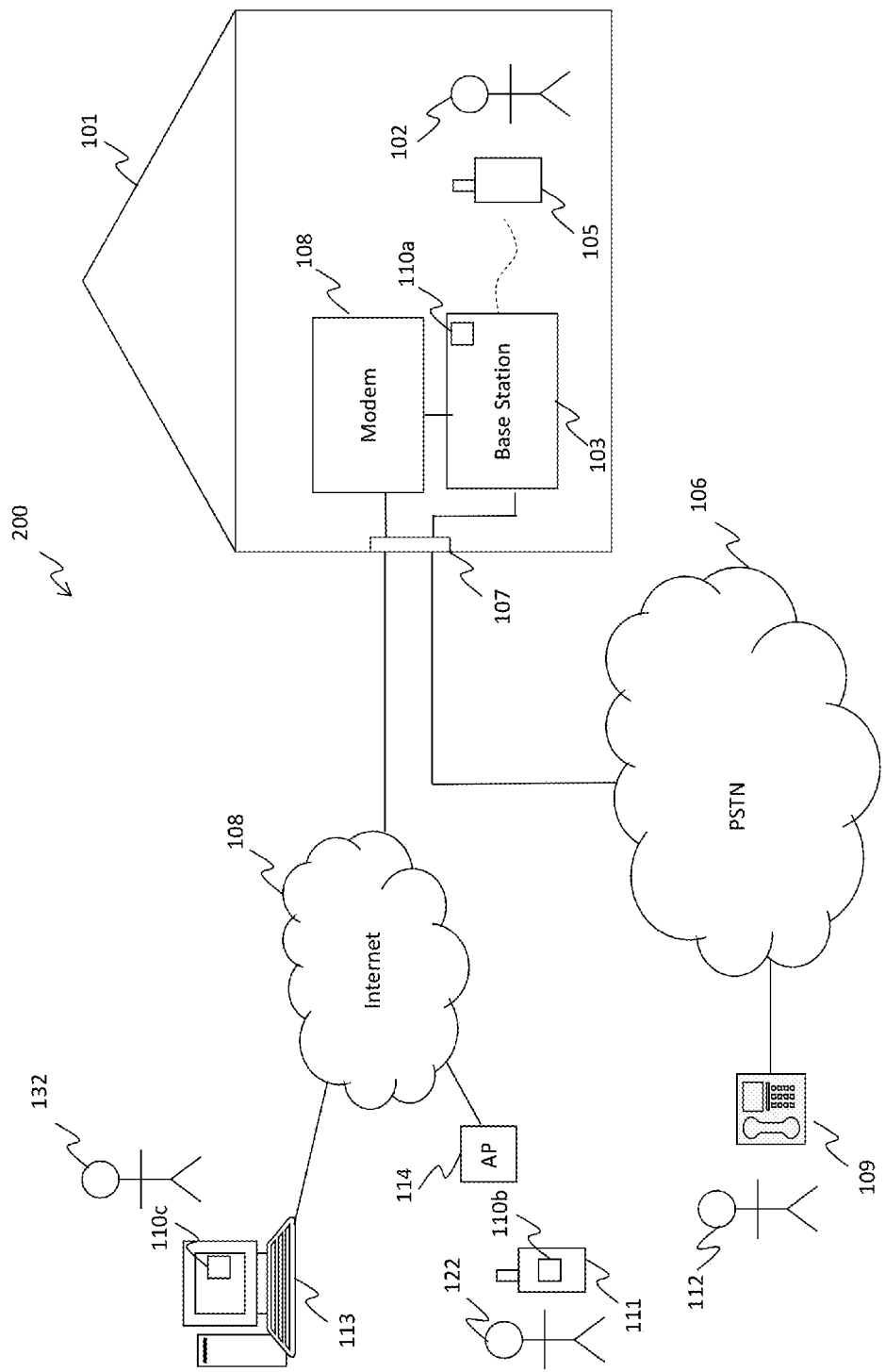
FIG. 2 shows a communication system comprising a base station executing embedded client software.
Figure 3:
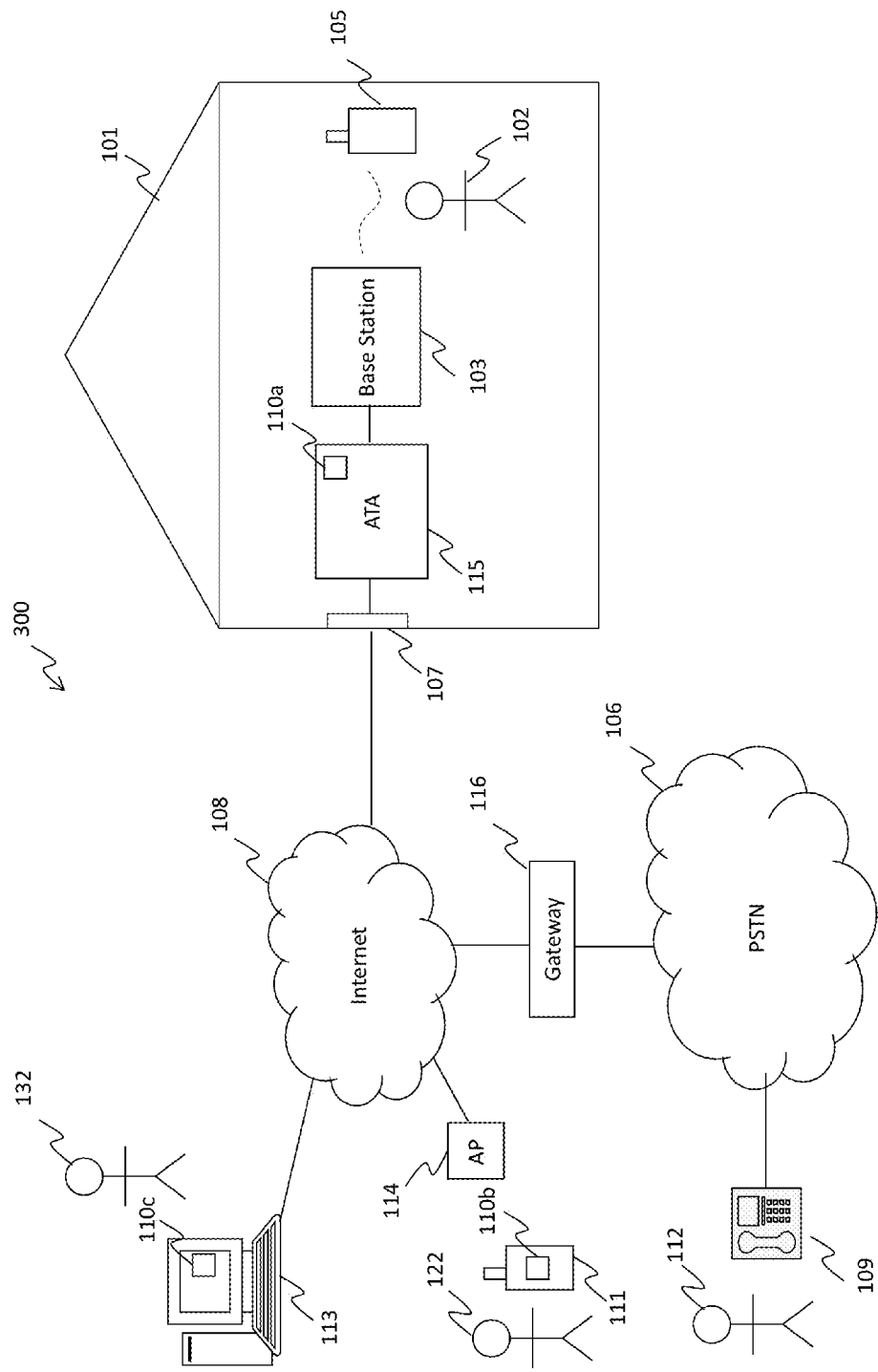
FIG. 3 shows a communication system comprising an analogue telephone adapter executing client software.

It will be apparent to persons skilled in the art that the set-up of the configuration shown in FIG. 4 is easily achieved. That is, user 102 must simply plug the ATA module 450 into the BS 402. User 102 of the BS 402 does not need to carry out a multitude of installation steps as required when installing the conventional configuration shown in FIG. 3. That is, user 102 does not need to (i) disconnect the telephone cable 420 that is connected between the BS 402 and the telephone socket 107; (ii) connect a power cable to the ATA module 450; or connect an appropriate cable between the BS 402 and the ATA module 450. Therefore the invention advantageously provides a solution to the aforementioned problems by providing hardware that is easy to install which enables a user to place voice and video calls over the Internet 108.

The ATA module 450 comprises a CPU 451 connected to the ATA connector 455, which controls the operation of the ATA module 450. A network interface 454 is provided in the ATA module 450 that is connected to the CPU 451.

The network interface 454 of the ATA module 450 may be an Ethernet cable port such that the only additional connection that is required is an Ethernet cable 430. In the embodiment of the invention shown in FIGS. 4a and 4b an ADSL connection to the Internet can be established using the network interface 454. The Ethernet cable 430 can be used to connect between the network interface 454 and the telephone socket 107. It will be appreciated that in order to use the data and PSTN services simultaneously, it is necessary to use a DSL filter (not shown in FIG. 4) plugged into the telephone socket 107 to divide the single telephone line into two discrete channels, as described above. Alternatively, the network interface 454 of the ATA module 450 may be a wireless Ethernet network interface, in which case no additional connections are required. That is, the wireless Ethernet network interface would wirelessly transmit and receive data to/from a router (not shown in FIG. 4) connected to the telephone socket 107.

The ATA module 450 further comprises memory 452, memory 452 may comprise a non-volatile memory such as an electronic erasable and programmable memory (EEPROM, or "flash" memory). Stored in memory 452 is a Software Development Kit (SDK) 453 which comprises communication client software and Application Programming Interfaces (APIs).

Referring back to the connections between the base station interface 415 and the ATA interface 455. When the ATA module 450 is plugged into the BS 402 the telephone signal connector 417 makes an electrical contact with telephone signal connector 457.

When the BS 402 receives analogue call signals to call a user 122,132 connected to the Internet 108 at the interface 407 from handset 105, the CPU 401 receives the analogue call signals from the interface 407 and passes the analogue call signals to the base station interface 415.

When a switching module 403 is used, the CPU 401 determines that a connection between the base station interface 415 and the ATA interface 455 has been made, and the CPU 401 controls the switching module 403 to supply the analogue call signals to the base station interface 415 (and not the PSTN interface 411). Alternatively, a direct connection between the CPU 401 and the base station interface 415 may be created by the removal of the replaceable connector referred to above and the insertion of the ATA module 450.

The analogue call signals are sent from the base station interface 415 to the CPU 451 using mating connectors 417, 457. The analogue call signals are processed by the CPU 451 into packet data for transmission, as is known in the art. This is carried out by the communication client software 453. The packet data is sent from the network interface 454 to the telephone socket 107 which enables the packets to be transmitted across the Internet 108. The electrical contact between telephone signal connector 417 and telephone signal connector 457 provides a bi-directional communication path for analogue call signals.

When packet call data is received over the network at interface 454 the CPU 451 decodes the packet call data and generates analogue call signals in a suitable form to be sent to the BS 402 via mating connectors 457,417 and then sent to the handset 105 via the interface 407 for output to user 102.

When the ATA module 450 is plugged into the BS 402 the data connector 418 makes an electrical contact with data connector 458. The electrical contact provides a data interface (that may be a serial or parallel interface) that allows bi-directional communications between the BS 402 and the ATA module 450. The communication protocol adopted for communication of digital data across the data interface may be proprietary or a suitable open standard if appropriate.

When the ATA module 450 is plugged into the BS 402, The CPU 451 retrieves the SDK 453 from memory 452 and executes the communication client software.

The communication client performs the processing required at the ATA module 450 in order for the ATA module 450 to transmit and receive data over the communication system 400. In addition, the communication client generates user interface data for the handset 105 and receives user data from the handset as described later. One function of the communication client is to establish calls. As is known in the art, the client may be authenticated to communicate over the communication system through the presentation of digital certificates. Once the client software has been provided with the certificate, communication can subsequently be set up and routed between users of the communication system 400. In particular, the users can establish their own communication routes through the communication system based on the exchange of one or more digital certificates (or user identity certificates, "UIC"), which enable access to the communication system. The exchange of the digital certificates between users provides proof of the user's identities and that they are suitably authorised and authenticated in the communication system—described in more detail in WO 2005/009019).

Figure 5:
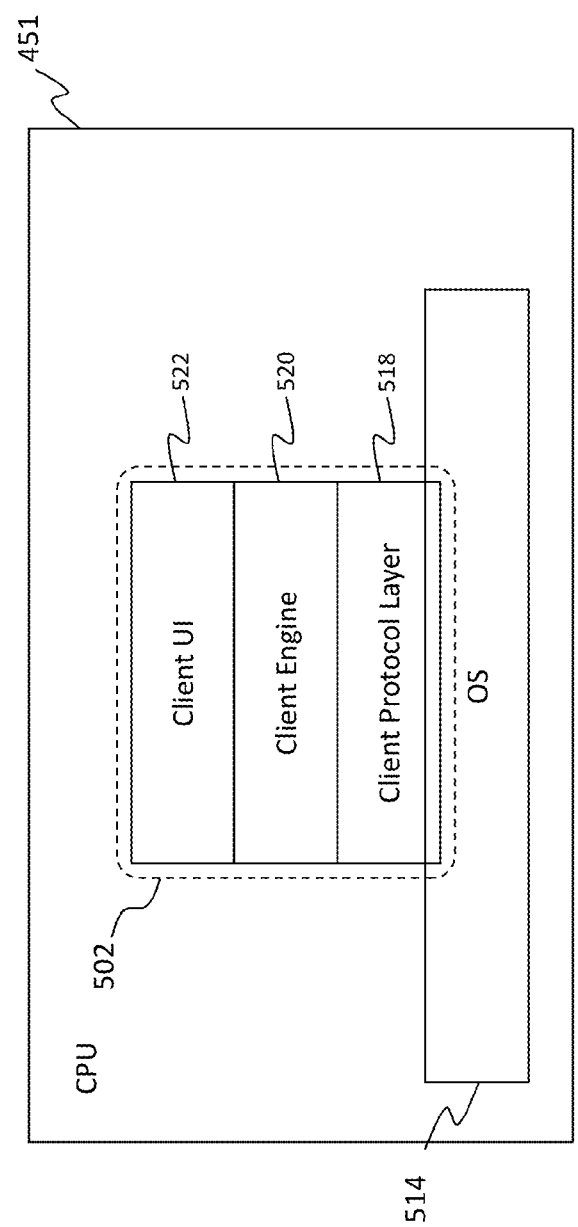
FIG. 5 is a schematic representation of a protocol stack.

FIG. 5 illustrates an operating system ("OS") 541 executed on the CPU 451. Running on top of the OS 514 is a software stack 502 for the client. The software stack shows a client protocol layer 518, a client engine layer 520 and a client user interface layer ("UI") 522. Each layer is responsible for specific functions. Because each layer usually communicates with two other layers, they are regarded as being arranged in a stack as shown in FIG. 5. The operating system 514 manages the hardware resources of the ATA module 450 and handles the transmission and receipt of packet data via the network interface 454. The client protocol layer 518 of the client software communicates with the operating system 514 and manages the connections over the communication system 400. Processes requiring higher level processing are passed to the client engine layer 520. The client engine 520 also communicates with the client user interface layer 522. The client engine 520 may be arranged to control the client user interface layer 522 to provide User Interface (UI) data.

When the communication client software is executed on the CPU 451, the UI data is transmitted over the data connectors 418,458 to the BS 402 in accordance with the adopted protocol and stored in memory 404. Thus the BS 402 becomes "Skype Ready", meaning the BS 402 is able to provide UI data to handset 105 to enable the handset 105 access to services provided by the communication client software 502.

This UI data can then be transmitted from the BS 402 to handset 105 using interface 407 for display on the handset 105 using any UI preferred by the manufacturer of the BS 402/handset 105. The BS 402 can communicate the UI data to handset 105 using a proprietary or suitable standard protocol for example CAT-iq, or any standard preferred by the manufacturer of the BS 402/handset 105.

Figure 6:
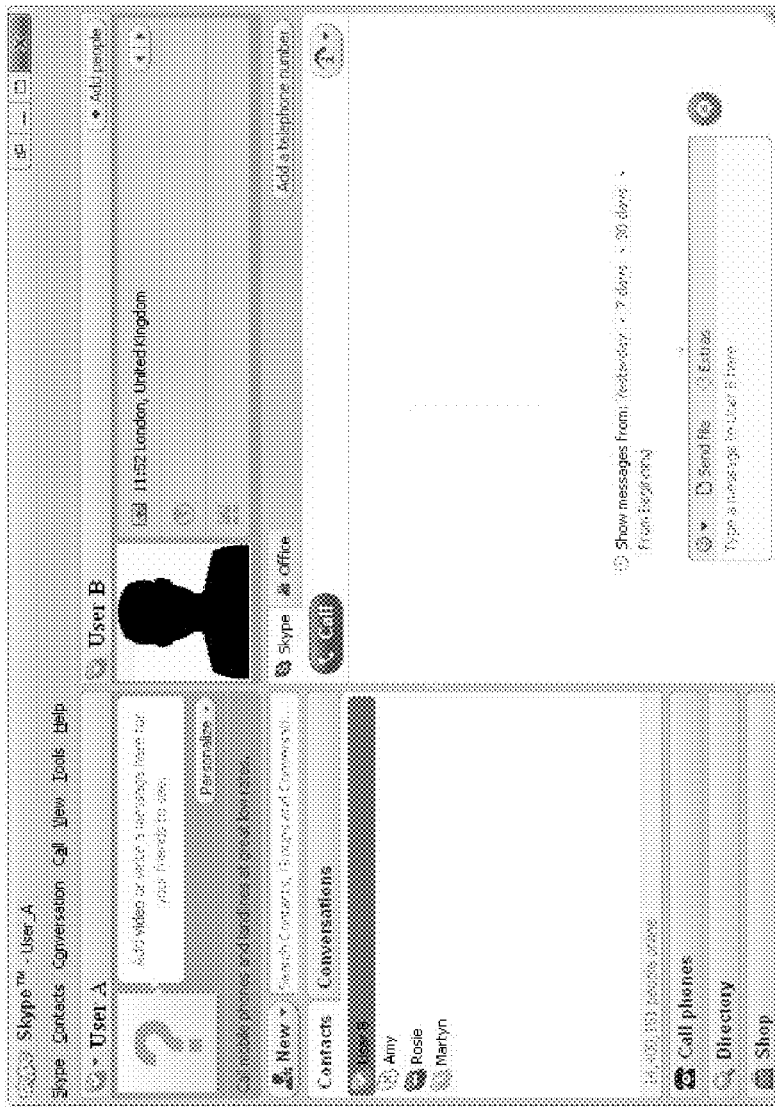
FIG. 6 shows a user interface.

The UI data may comprise information related to the presentation of decoded call data to the user via a display on the handset 105, the presentation of contacts and a contact list, along with other information such as presence and profile information and user controls such as buttons and menus, and for receiving inputs from the user via the presented controls. An example user interface displayed on handset 105 is shown in FIG. 6.

The UI data allows communication client software functions such as: sign in, sign out, display credit status, directory/contact information, call a contact, send/receive instant message, voicemail etc. to be available to user 102 through the UI at the handset 105.

The invention advantageously provides a user of the BS 402 and handset 105 the UI data to provide access to functionality of the communication client software without the necessary expense of the user having to purchase a base station with embedded client software, or a cordless phone with an embedded client.

Whilst the ATA module 450 has been described above in use with a telephone base station, it will be appreciated that the ATA module 450 can be plugged into other devices to add networking capability to those devices and provide the user interface information, as described above, on these devices.

One example device that the ATA module 450 may be plugged into is a television.

It will be apparent to persons skilled in the art that known televisions comprise a plurality of input ports which can be utilised for connecting the ATA module 450 to the television, and provide the connectors 416,417,418.

It will be appreciated that the television has similar components to the BS 402 shown in FIG. 4b. That is, televisions are configured to connect to an external power source using a power cable via a power interface. Televisions may also comprise an interface for receiving analogue call signals. For example, a microphone may be integrated into the television or an external microphone may be connected to the television by an appropriate interface, to enable the television to receive analogue voice signals. Similarly a camera may be integrated into the television or an external camera may be connected to the television by an appropriate interface, to enable the television to receive analogue video signals.

Televisions are not currently designed to accommodate any form of bi-directional communications, unless they include an embedded client. However by plugging the ATA module 450 into the television, power can be delivered to the ATA module 450 using connections 416,456 to enable the CPU 451 to retrieve the SDK 453 from memory 452 and execute the communication client software contained therein on the operating system.

This enables UI data to be transmitted over the data connectors 418,458 to the television in accordance with an adopted protocol and stored in memory. Thus the television becomes "Skype Ready", meaning the television is able to provide UI data to a user. A television has the advantage that a large screen is present, which can be utilised for the display of the UI information.

It will be appreciated that in order to provide the packet based services to the television, the ATA module must be connected to a packet based network, this is provided by the network interface 454 as described in detail above.

Televisions are typically located in a living room of a house. Therefore by plugging the ATA module into a television enables the packet-based communication system to be accessed from the location in the house which is most familiar to many users for communicating with friends and relatives.

Alternatively, the ATA module 450 may be plugged into a set-top box (STB) or other TV-connected device which is readily connected to a television using known interfaces (such as a HDMI, SCART or component interface, for example). Examples of other TV-connected devices include a video disc player, a personal video recorder and a games console. It will be apparent to persons skilled in the art that known TV-connected devices comprise a plurality of input ports which can be utilised for connecting the ATA module 450 to the television, and provide the connections 416,417, 418.

By plugging the ATA module 450 into a TV-connected device, UI data is able to be transmitted over the data connectors 418,458 to the TV-connected device in accordance with an adopted protocol and stored in memory. Thus the TV-connected device becomes "Skype Ready", meaning the TV-connected device is able to provide UI data to a user through an appropriate interface. It will be appreciated that the UI data can be supplied on a connection to a television, for display on the television screen.

Televisions and the TV-connected devices described above do not currently support analogue telephone lines i.e. a connection to the PSTN. In an alternative embodiment, the ATA module 450 comprises a PSTN interface (not shown in FIG. 4*b*). This enables analogue call signals received at the television (i.e. at a microphone and/or camera) to be sent to the ATA module 450 via telephone signal connectors 417, 457. The analogue call signals may then be sent to the PSTN interface at the ATA module 450 without being processed by the CPU 451 (i.e. converted into packet data) and sent across the PSTN. Similarly analogue call signals sent over the PSTN may be received at the PSTN interface, and sent to the television where the call signals may be output via speakers (voice) and/or a screen (video). This advantageously provides PSTN functionality to living room devices. While this invention has been particularly shown and described with reference to preferred embodiments, it will be understood to those skilled in the art that various changes in form and detail may be made without departing from the scope of the invention as defined by the dependent claims.

Whilst FIGS. 4*a* and 4*b* show that an ADSL connection to the Internet 108 can be established using the network interface 454 of the ATA module 450, it will be appreciated that the ATA module 450 can provide access to the Internet 108 using other broadband connection methods without a connection to the telephone socket 107, for example cable, satellite, 4G, and optical fibre, wherein the network interface 454 may be an Ethernet cable port or a wireless Ethernet network interface.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The invention claimed is:

1. A communications module comprising:
a network interface for connecting to a packet data network;
a connection interface arranged to plug into a consumer device to establish a set of connections between the communications module and the consumer device, the set of connections comprising:
at least one connection for exchanging analogue call signals with the consumer device; and
at least one data connector for communication of user interface data with the consumer device;
a processor; and
memory comprising instructions of a communication client executable by the processor to perform operations comprising:
converting analogue call signals received from the consumer device into packet data;
supplying the packet data to the network interface; and
sending the user interface data for display at the consumer device via the data connector.

2. The communications module according to claim 1, wherein the set of connections further comprises a power connector to provide power from the consumer device to the communications module.

3. The communications module according to claim 1, wherein the user interface data conforms to a proprietary protocol or an open standard protocol.

4. The communications module according to claim 1, wherein the instructions are further executable to perform operations comprising:
receiving user data from the consumer device via the data connector and;
generating the user interface data responsive to receiving the user data.

5. The communications module according to claim 1, wherein the instructions are further executable to perform operations comprising:
   converting packet data received over the packet data network at the network interface into analogue call data; and
   supplying the analogue call data to the consumer device using the at least one connection for exchanging analogue call signals.

6. The communications module according to claim 1, wherein the data connector is a serial or parallel connector.

7. The communications module according to claim 1, wherein the network interface is a radio frequency transceiver.

8. The communications module according to claim 1, wherein the network interface is an Ethernet interface.

9. The communications module according to claim 1, wherein the communications module further comprises a circuit switched network interface for connecting to a circuit switched network.

10. The communications module according to claim 1, wherein the instructions of the communication client are further executable to perform operations comprising:
    accessing a communication system; and
    establishing a packet data call.

11. The communications module according to claim 1, wherein the instructions of the communication client are further executable to perform operations comprising:
    obtaining an authorisation certificate for exchanging in call establishment.

12. A consumer device comprising:
    a call interface for receiving analogue call signals;
    a switch configured to supply the analogue call signals to a connection interface;
    the connection interface arranged to connect to a communications module to establish a set of data connections between said connection interface and the communications module, the set of connections comprising:
      at least one connector for exchanging analogue call signals with the communications module; and
      at least one data connector, wherein the consumer device is configured to receive user interface data for display at the consumer device via the data connector.

13. The consumer device according to claim 12, wherein the set of connections further comprises a power connector to supply power from the consumer device to the communications module.

14. The consumer device according to claim 12, wherein the consumer device is configured to receive power from a power source.

15. The consumer device according to claim 12 wherein the user interface data is received via the data connector according to a proprietary protocol or an open standard protocol.

16. The consumer device according to claim 12, wherein the data connector is a serial or a parallel connector.

17. The consumer device according to claim 16, wherein the consumer device is a telephone base station connected to a handset, wherein the user interface data is transmitted from the base station to the handset via the call interface and displayed on a display of the handset.

18. The consumer device according to claim 17, wherein the telephone base station is connected to the handset by a wired connection.

19. The consumer device according to claim 17, wherein the call interface is a radio frequency transceiver coupled to a radio frequency module to enable the telephone base station to transmit the user interface data wirelessly to the handset.

20. The consumer device according to claim 19, wherein the radio frequency transceiver transmits the user interface data wirelessly to the handset according to a proprietary protocol or an open standard protocol.

21. The consumer device according to claim 20, wherein the open standard protocol is CAT-iq.

22. The consumer device according to claim 17, wherein the telephone base station comprises an interface to a circuit switched network and the switch is further configured to supply the analogue call signals to the interface to the circuit switched network.

23. The consumer device according to claim 12, wherein the consumer device is a television and the user interface data is displayed on a screen of the television.

24. The consumer device according to claim 12, wherein the consumer device is one of a video disc player arranged to connect to a television, a set top box arranged to connect to a television, a personal video recorder arranged to connect to a television or a games console arranged to connect to a television, wherein the user interface data is displayed on the television.

* * * * *